US011560645B2

(12) United States Patent
Desai et al.

(10) Patent No.: US 11,560,645 B2
(45) Date of Patent: Jan. 24, 2023

(54) CARBON FIBER FABRICATION SYSTEMS AND METHODS

(71) Applicant: Palo Alto Research Center Incorporated, Palo Alto, CA (US)

(72) Inventors: Divyaraj Desai, Montville, NJ (US); Gabriel Iftime, Newark, CA (US); Dane Andrew Boysen, Anchorage, AK (US); Jessica Louis Baker Rivest, Palo Alto, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 256 days.

(21) Appl. No.: 17/032,582

(22) Filed: Sep. 25, 2020

(65) Prior Publication Data
US 2022/0098762 A1 Mar. 31, 2022

(51) Int. Cl.
*D01F 9/127* (2006.01)
*B01J 23/06* (2006.01)

(52) U.S. Cl.
CPC ............ *D01F 9/1272* (2013.01); *B01J 23/06* (2013.01); *D10B 2101/12* (2013.01)

(58) Field of Classification Search
CPC .......... D01F 9/1272; D01F 9/12; D01F 9/133; D01F 9/32; B01J 23/06; D10B 2101/12
See application file for complete search history.

(56) References Cited

U.S. PATENT DOCUMENTS

| 4,900,483 A | 2/1990 | Witzke et al. |
| 6,489,027 B1 | 12/2002 | Kondo et al. |
| 2019/0055173 A1* | 2/2019 | Desai ...................... C22C 38/00 |

FOREIGN PATENT DOCUMENTS

JP 4711428 B2 6/2011

OTHER PUBLICATIONS

Rudolph, et al., Fiber Crystal Growth From the Melt, Cryst. Res. Technol. 1999; 34: 3-40 (Year: 1999).*
EP Search Report for corresponding EP Application No. 21197820.0 dated Feb. 17, 2022.
Chien-Min Sung, Ming-Fong Tai, "Reactivities of transition metals with carbon: Implications to the mechanism of diamond synthesis under high pressure, International Journal of Refractory Metals and Hard Materials", vol. 15, Issue 4, 1997, pp. 237-256, ISSN 0263-4368, https://doi.org/10.1016/S0263-4368(97)00003-6, https://www.sciencedirect.com/science/article/pii/S0263436897000036.

* cited by examiner

*Primary Examiner* — Daniel C. McCracken
(74) *Attorney, Agent, or Firm* — Vorys, Sater, Seymour and Pease LLP

(57) ABSTRACT

Methods comprising: contacting a carbon fiber seed to a carbon-metal melt, drawing the carbon fiber seed to form a carbon fiber. And, systems and apparatuses comprising: a carbon fiber reactor for fabricating carbon fiber, the reactor comprising a receptacle for containing a carbon-metal melt, and a plurality of nozzles through which a plurality of menisci are formed by the carbon-metal melt for contact with a carbon seed to fabricate the carbon fiber.

13 Claims, 10 Drawing Sheets

CARBON FIBER FABRICATION SYSTEMS AND METHODS

BACKGROUND

The present disclosure relates to carbon fiber production.

The U.S. and the broader international community continue to lack a scalable, low-cost carbon fiber production technology.

The raw material used to make carbon fiber is called the precursor. About 90% of carbon fibers are currently produced from polyacrylonitrile (PAN) fiber precursors, the remaining 10% are made from rayon or petroleum pitch fiber precursors. Carbon fiber is sold as fiber tows wound on bobbins; a typical carbon fiber tow is composed of 1,000 to 50,000 fibers, each 5 to 15 µm in diameter, and each 1 to 10 km long. Commercial carbon fiber production using the PAN fiber precursors ("PAN-based method") involves relatively expensive unit operations, including spinning, stabilization, carbonization, and graphitization. Manufacturing costs are typically approximately 22 USD/kg, with the PAN precursor representing roughly 50% of that cost. Therefore, alternative approaches to carbon fiber production that utilize lower cost precursors have the potential to displace current PAN-based carbon fiber production. Indeed, optimized high strength, commercial grade, carbon fiber generally retails from 30 USD/kg to 100 USD/kg, depending on the particular optimization. Consequently, commercial markets for PAN-based carbon fiber are currently limited to high-performance applications (e.g., aerospace applications).

To reduce the cost of carbon fiber, less expensive alternatives to PAN precursors have been pursued, such as precursors based on cellulose (e.g., viscose, rayon, lyocell, tire cord cotton, Fortisan, Cupro, Bocell), lignin, polyethylene, polyvinylidene chloride-polyvinyl chloride copolymer, polybutadiene, polystyrene, and poly(p-phenylene benzobisoxazole). However, carbon fibers produced from these precursors may lack the desired mechanical properties or uniformity, involve additional processing, or required additional energy input that impedes their use.

As an alternative to polymer-based carbon fiber production, vapor-grown carbon fibers from the pyrolysis of benzene has been investigated, in which carbon fiber is grown on substrates periodically seeded with nanometer-sized catalysts. Although this method can grow fibers from 1 to 10 cm in length, the dimensional inhomogeneity, low yield, and operational discontinuity may be challenging, and any potential overcoming of these challenges may require further processing.

SUMMARY

The present disclosure relates to carbon fiber production.

Some aspects of the present disclosure provide methods including contacting a carbon fiber seed with a meniscus of a carbon-metal melt, drawing the carbon fiber seed from the meniscus at a pulling rate to form a carbon fiber.

Some aspects of the present disclosure provide systems including a carbon fiber reactor for fabricating carbon fiber, the reactor comprising a receptacle for containing a carbon-metal melt, and a plurality of nozzles through which a plurality of menisci are formed by the carbon-metal melt for contact with a carbon seed to fabricate the carbon fiber; and a heater for heating the carbon-metal melt.

Some aspects of the present disclosure provide systems including a carbon fiber reactor for fabricating carbon fiber, the reactor comprising a receptacle for containing a carbon-metal melt, and a plurality of nozzles through which a plurality of menisci are formed by the carbon-metal melt for contact with a carbon seed to fabricate the carbon fiber.

BRIEF DESCRIPTION OF THE DRAWINGS

The following figures are included to illustrate certain aspects of the present disclosure and should not be viewed as exclusive. The subject matter disclosed is capable of considerable modifications, alterations, combinations, and equivalents in form and function, as will occur to those skilled in the art and having the benefit of this disclosure.

DETAILED DESCRIPTION

Figure 1:
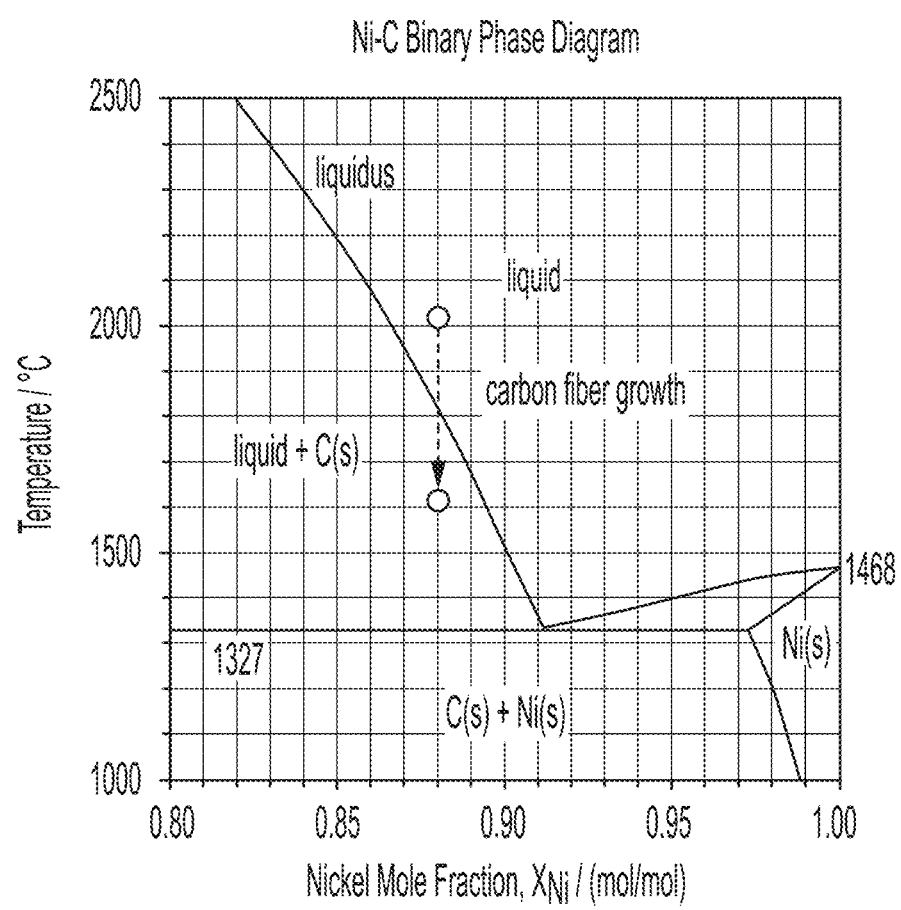
FIG. 1 is a Ni—C binary phase diagram for carbon fiber fabrication according to one or more aspects of the present disclosure.

Unless otherwise defined, all technical and scientific terms used herein have the same meaning as commonly understood by one of ordinary skill in the art. In case of conflict, the present document, including definitions, will control. Preferred methods and materials are described below, although methods and materials similar or equivalent can be used in practice or testing of the present disclosure. The materials, methods, and articles disclosed herein are illustrative only and not intended to be limiting.

The singular forms "a," "an," and "the" include plural referents unless the context clearly dictates otherwise.

As used in the specification and in the claims, the term "comprising" may include the embodiments "consisting of" and "consisting essentially of." The terms "comprise(s)," "include(s)," "having," "has," "can," "contain(s)," and variants thereof, as used herein, are intended to be open-ended transitional phrases that require the presence of the named ingredients or steps and permit the presence of other ingredients or steps. However, such description should be construed as also describing compositions, mixtures, or processes as "consisting of" and "consisting essentially of" the enumerated ingredients or steps, which allows the presence of only the named ingredients or steps, along with any impurities that might result therefrom, and excludes other ingredients or steps.

Unless indicated to the contrary, the numerical values in the specification should be understood to include numerical values which are the same when reduced to the same number of significant figures and numerical values which differ from the stated value by less than the experimental error of the conventional measurement technique of the type used to determine the particular value.

All ranges disclosed herein are inclusive of the recited endpoint and independently combinable (for example, the range of "from 2 to 10" is inclusive of the endpoints, 2 and 10, and all the intermediate values). The endpoints of the ranges and any values disclosed herein are not limited to the precise range or value; they are sufficiently imprecise to include values approximating these ranges and/or values.

As used herein, approximating language may be applied to modify any quantitative representation that may vary without resulting in a change in the basic function to which it is related. Accordingly, a value modified by a term or terms, such as "about" and "substantially," may not be limited to the precise value specified, in some cases. The modifier "about" should also be considered as disclosing the range defined by the absolute values of the two endpoints. For example, the expression "from about 2 to about 4" also discloses the range "from 2 to 4." The term "about" may refer to plus or minus 10% of the indicated number. For example, "about 10%" may indicate a range of 9% to 11%, and "about 1" may mean from 0.9-1.1.

For the recitation of numeric ranges herein, each intervening number therebetween with the same degree of precision is explicitly contemplated. For example, for the range of 6 to 9 (6-9), the numbers 7 and 8 are contemplated in addition to 6 and 9, and for the range 6.0 to 7.0 (6.0-7.0), the number 6.0, 6.1, 6.2, 6.3, 6.4, 6.5, 6.6, 6.7, 6.8, 6.9, and 7.0 are explicitly contemplated.

As used herein, the term "liquidus," and grammatical variants thereof, refers to the temperature above which a material is completely liquid; it is the maximum temperature at which crystals are able to co-exist within a molten melt in thermodynamic equilibrium.

As used herein, the terms "condense" and "condensing," and grammatical variations thereof, refer to a phase change from gas to liquid but does not imply a percentage of the material undergoing said phase change. For example, a catalyst gas can be condensed into a catalyst vapor that comprises catalyst in the liquid phase (e.g., as droplets) and optionally still include catalyst in the gas phase.

As used herein, the term "catalyst vapor," and grammatical variants thereof, refers to liquid catalyst droplets suspended in a gas that may or may not comprise catalyst in the gas phase. When describing a reaction with a catalyst vapor, the reaction may occur with the catalyst in the gas phase and/or the catalyst in the liquid phase.

As used herein, the term "carbon-metal melt," and grammatical variants thereof, refers to a carbon-metal (C-M) liquid solution or molten metal comprising dissolved carbon, where the molten metal (M) is composed of one or more metals (e.g., M=Co, Fe, La, Mn, Ni, Pd, Pt, Rh, Ru, Si, and the like). The carbon-metal melt may comprise elemental carbon that is derived from a plurality of carbon sources (e.g., hydrocarbon pyrolysis, biochar, recycled plastics, pet coke, and the like) in combination with one or more metal (M) elements in various ratios, including those listed above and any of one or more of alkali metals, alkaline earth metals, transition metals, post-transition metals, lanthanide metals, and actinide metals. Various additional examples of carbon sources and metals are provided hereinbelow. In one or more particular aspects of the present disclosure, the compositions of carbon-metal melts have high carbon solubilities ($x_C$>5% mol/mol, such as about 5% mol/mol to about 50% mol/mol, encompassing any value and subset therebetween) at reduced temperatures ($T_m$<2,000° C., such as about 1,000° C. to about 2,000° C., encompassing any value and subset therebetween) and do not preferentially form stable metal-carbide compounds over solid carbon (graphite) upon cooling (e.g., $CaC_2$, HfC, $LaC_2$, $Mg_2C$, $Mo_2C$, NbC, $Nb_2C$, TaC, $Ta_2C$, TiC, VC, $V_2C$, WC, $W_2C$, or ZrC).

As shown in FIG. 1, illustrating a Ni—C binary phase diagram, the carbon-metal melt becomes saturated as it passes through the liquidus as a carbon fiber is fabricated according to various aspects of the present disclosure.

As used herein, the term "carbon fiber seed," and grammatical variants thereof, refers to a carbon filament with a diameter of at least about 5 μm wide, a length of at least about 1 mm long, and a bulk density of less than about 2.2 g/cm$^3$ that is composed of hexagonal crystallites (space group $P6_3$/mmc) of carbon—also known as graphite. In one or more aspects of the present disclosure, for example, the width of the carbon fiber seed may be in the range of about 5 μm to about 50 μm, the length of the carbon fiber seed may be in the range of about 1 mm to about 1 m, and the bulk density of the carbon fiber seed may be in the range of about 1.7 g/cm$^3$ to about 2.2 g/cm$^3$, each encompassing any value and subset therebetween. In some instances, the bulk density of the carbon fiber seed is less than about 2.0 g/cm$^3$, or less than about 1.8 g/cm$^3$. The hexagonal crystallites of the carbon fiber seed are aligned with their c-axis perpendicular to the carbon-filament axis and have a length of at least about 5 nm, a width of at least about 2 nm, and an interplanar spacing ($d_{002}$ or c/2) of greater than about 0.33 nm. In one or more aspects of the present disclosure, for example, the length of the hexagonal crystallites may be in the range of about 5 nm to about 20 nm, the width of the hexagonal crystallites may be in the range of about 2 nm to about 5 nm, and the interplanar spacing of the hexagonal crystallites may be in the range of about 0.33 nm to about 0.35 nm, each encompassing any value and subset therebetween. In one or more aspects of the present disclosure, the carbon fiber seeds may be obtained from a commercial grade carbon fiber (e.g., from a spool comprising a bundle of such carbon filaments).

As used herein, the term "carbon source," and grammatical variants thereof, refers to a material from which a carbon feedstock is derived. As used herein, the term "carbon precursor feedstock," and grammatical variants thereof, refers to a solid-phase ("solid") carbon precursor in the form of a primarily carbon powder, pellet (e.g., a compressed mass), or aggregate (e.g., an agglomeration of pellets) for the direct use in the production of high value carbon fiber. The term "carbon precursor feedstock" is used herein interchangeably with the terms "carbon precursor" and "carbon feedstock."

As used herein, the term "capillary die-based fiber shaper technique," and grammatical variants thereof, refers to a methodology for forming a carbon fiber utilizing a capillary channel that allows a carbon-metal melt to rise through (either above or below) the opening of a die through the action of capillary force. Examples of such capillary die-based fiber shaper techniques for use in the present disclosure include, but are not limited to, a micro-pulldown (μ-PD) method and an edge-defined film fed growth (EFG) method. The μ-PD method produces a carbon fiber as it is pulled down from a meniscus hanging from a capillary die containing a carbon feedstock; inversely, the EFG method produces a carbon fiber as it is pulled up from a meniscus supported by a capillary die immersed in a carbon solution. While various aspects of the present disclosure are generally described with reference to the µ-PD method, it is to be appreciated that the various aspects of the present disclosure are equally applicable to the EGF method, without limitation.

Methods and apparatuses of the present disclosure employ low-value (or low-cost) carbon precursor feedstocks derived from low-value (or low-cost) carbon sources for use in the production of high value carbon fiber, the production of which involves a two-step procedure.

The first step comprises producing a solid carbon feedstock (from a carbon source) that is at least about 95% mol/mol elemental carbon, having less than about 5% mol/mol heteroatoms, and less than about 5% mol/mol metal impurities. The heteroatoms are not considered to be particularly limiting and depend on at least the selected carbon source; examples include, but are not limited to S, N, O, Cl, F, and the like, and any combination thereof. The metal impurities are not considered to be particularly limiting and depend at least on the selected carbon source; examples include, but are not limited to, Al, Ca, Fe, Mg, Na, K, Si, Ti, V, and the like, and any combination thereof. In one or more aspects of the present disclosure, for example, the carbon feedstock has an elemental carbon composition in the range of about 95% mol/mol to about 99.999% mol/mol, a heteroatom composition in the range of about 5% mol/mol to about 1 parts per million volume (ppmv) mol/mol, and a metal impurity composition in the range of about 5% mol/mol to about 1 ppmv mol/mol, each encompassing any value and subset therebetween.

The atomic structure of the carbon feedstock may range from completely amorphous to pure graphite. The carbon feedstock may be derived from a multitude of carbon sources (e.g., biomass, plastics, fossil fuels, petroleum coke, and the like, including those described hereinbelow) and via a variety of chemical processes (e.g., biomass processing, oil refining bi-products (petroleum coke), hydrocarbon pyrolysis (e.g., natural gas, acetylene, benzene, and the like), and the like, and any combination thereof. In one or more aspects, the carbon feedstock may be derived from the pyrolysis of natural gas (methane pyrolysis). In one or more aspects of a methane pyrolysis process according to the present disclosure, a hot gaseous metal (e.g., Zn) is simultaneously fed into a reactor with cool methane, whereupon the gaseous metal is cooled, inducing the formation of nano-sized liquid droplets that in turn catalyze the methane pyrolysis reaction and provides the heat of vaporization to the pyrolysis reaction (endothermic). It is to be understood that while one or more aspects of a methane pyrolysis process for deriving the carbon feedstock of the present disclosure is made with reference to the use of a hot gaseous Zn, any other metals (e.g., cesium, selenium, rubidium, potassium, cadmium, sodium, polonium, tellurium, magnesium, ytterbium, lithium, strontium, thallium, calcium, and the like, and any combination thereof), without limitation, may be used in such a pyrolysis reaction for the production of the carbon feedstock described herein, without departing from the scope of the present disclosure.

The second step comprises utilizing a carbon-metal melt in the presence of a carbon fiber seed that is continuously pulled away using a capillary die-based crystal shaper technique (the "carbon fiber fabrication process" or the "carbon fiber growth process," and grammatical variants thereof). The carbon fiber fabrication process utilizes a capillary die-based crystal shaper technique, as described hereinabove, including the µ-PD process or EFG process, without limitation. The present disclosure takes advantage of large temperature gradients of about $10^2$ to about $10^4$ K/mm achievable using these techniques as a means to facilitate carbon precipitation and carbon fiber growth. The carbon fiber fabrication process is differentiated from previous capillary die-based crystal fiber growth techniques in that the fiber composition (pure carbon) is not representative of the carbon-metal melt (also referred to as the "mother solution composition"). In one or more aspects of the carbon fiber fabrication process of the present disclosure, control of carbon fiber growth may be accomplished through the use of the die capillary through which the dissolved carbon will diffuse.

The present disclosure aims to lower the cost of carbon fiber production below the current, standard cost of approximately 22 USD/kg. In some instances, the cost may be lowered to less than about 15 USD/kg, or less than about 10 USD/kg, or less than about 7 USD/kg, excluding graphitization and stabilization post-treatments. At these reduced costs, the carbon fiber produced in accordance with various aspects of the present disclosure may penetrate larger market sectors, such as the automotive, marine, and construction sectors, among other sectors, which have heretofore not widely used carbon fibers due to cost concerns. For example, in the automotive market sector, a reduction of carbon fiber costs may allow carbon fiber-reinforced polymer composite autobodies to economically replace steel autobodies, thus reducing automobile weight and increasing fuel efficiency by as much as about 28%. As a result, U.S. transportation energy consumption could be reduced by up to 7.9 Quads and emissions reduced by about 1.4 Gt $CO_2$ per year (~8% of total U.S. energy and emissions).

In various aspects, to achieve the desired carbon fiber production cost reduction described herein, low-value (or low-cost) carbon feedstocks are used, rather than the more expensive PAN feedstocks used to produce most of today's carbon fibers. The source of the carbon feedstocks for use in various aspects of the present disclosure is not considered to be particularly limited. Examples of suitable carbon feedstocks include, but are not limited to, solid carbon derived from a hydrocarbon gas (e.g., methane, ethane, propane, butane, acetylene, and the like), a hydrocarbon liquid (e.g., hexeane, benzene, and the like), a hydrocarbon solid (e.g., paraffin wax, naphthalene, and the like), and any combination thereof. Other carbon feedstocks may be derived from industrial or natural environmental processes, waste products therefrom, such as a natural gas, a flared natural gas, a biogas, a pyrolysis gas, petcoke, coal, soot, recycled pure carbon fiber waste, recycled carbon fiber composite waste, a plastic, a recycled plastic, a biomass, organic waste, petroleum, an oil (e.g., synthetic and/or natural oil), biochar, other fossil fuels, and the like, and any combination thereof. It is to be understood, accordingly, that one or more components of a natural gas, a flared natural gas, a biogas, a pyrolysis gas, petcoke, coal, soot, recycled pure carbon fiber waste, recycled carbon fiber composite waste, a plastic, a recycled plastic, a biomass, organic waste, petroleum, an oil (e.g., synthetic and/or natural oil), biochar, other fossil fuels, and the like, and any combination thereof includes any one, more, or all of a hydrocarbon constituent (e.g., gas, liquid, solid, as described herein). Advantageously, these low-value carbon feedstocks not only contribute to reducing carbon fiber costs, but can also contribute to realizing previously untapped environmental and economic benefits.

For example, the inherent compositional variability, intermittency, and cost-prohibitive transportability of flared natural gas poses a significant challenge for market use. As a consequence, approximately 1% of annual gas production is flared or vented into the atmosphere, which raises concerns relating to environmental impact and results in an estimated annual domestic loss of nearly 1 billion USD. As a result of these concerns, recent approaches for harvesting flared gas for various uses have been explored. These uses include onsite electricity generation, modular natural gas liquids recovery, and small modular natural gas liquefaction. However, such uses remain insufficiently cost-effective at the scale necessary to address faring rates at individual petrochemical facilities. Other low-value carbon sources traditionally suffer from similar issues, and can now be utilized in accordance with the various aspects of the present disclosure.

Carbon Fiber Fabrication Process

The carbon fiber fabrication process of the present disclosure differs from traditional commercial carbon fiber production processes. Specifically, the carbon fiber fabrication process of the present disclosure may utilize solid carbon obtained from a methane pyrolysis process as a feedstock to form a carbon-metal melt solution that provides dissolved atomic carbon to a molten metal-carbon meniscus that is cooled to below the melt liquidus temperature in the presence of a carbon fiber seed, whereupon the decrease in equilibrium carbon solubility of the carbon-metal melt encourages carbon to crystallize onto a carbon fiber seed positioned at the meniscus bottom. As the carbon fiber grows, it is continuously pulled away from the meniscus using a capillary die-based fiber shaper technique, as described herein (e.g., the μ-PD method, the EFG method, or any other capillary die-based fiber shaper technique fiber growth method), to form carbon fiber, which permits precise fiber dimensional control through the use of a shaper nozzle (also referred to in the art as a die). The use of these crystal fiber growth technologies have not heretofore been used for commercial-scale carbon fiber production and, as described herein, contributes to lowering carbon fiber costs, particularly in combination with the other cost-saving measures described herein. That is, while the crystal fiber growth processes of the present disclosure are described primarily with reference a carbon-metal melt formed from input of solid carbon obtained from a methane pyrolysis process, other carbon sources are equally able to be used in the μ-PD carbon fiber fabrication process, without departing from the scope of the present disclosure.

The carbon fiber growth described herein is based on continuous carbon transport in a carbon-metal melt (e.g., produced from the solid carbon obtained from the methane pyrolysis process described hereinbelow in the presence of a metal) through micro-channel nozzles made within a crucible bottom. Advantageously, the disclosed processes do not require that the starting carbon be the same or substantially the same as the desired phase or atomic structure of the produced carbon fiber, thereby allowing low-value carbon to be used as the carbon source feedstock for producing the carbon fiber. Moreover, the high temperature gradient in the vicinity of the solid-liquid interface leads to high growth stability and a homogeneous distribution of carbon in produced fiber. The high temperature gradient also reduces or eliminates constitutional supercooling, permitting the use of relatively high carbon fiber growth rates.

Figure 2:
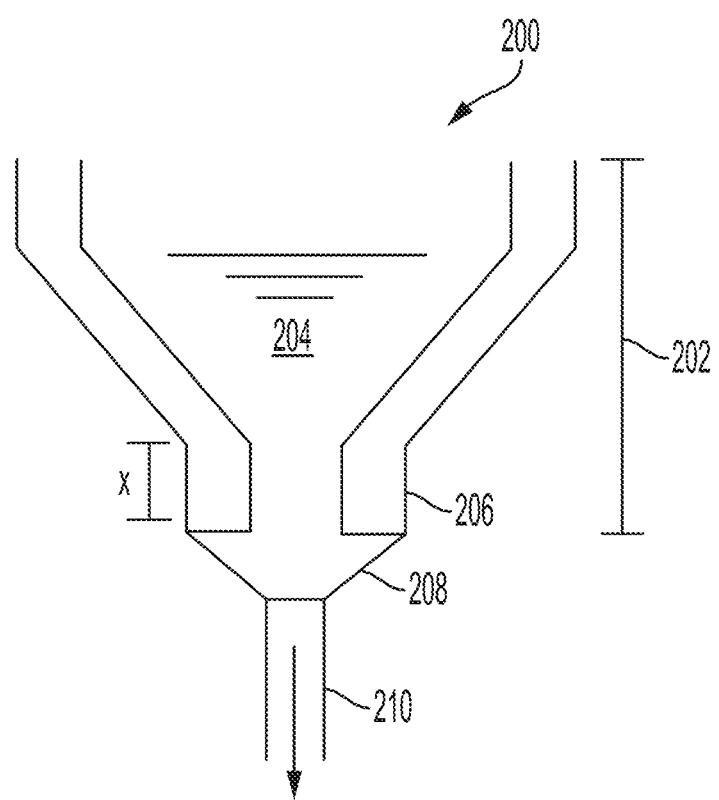
FIG. 2 illustrates a nonlimiting example of a carbon fiber micro-pulldown (µ-PD) apparatus according to one or more aspects of the present disclosure.

FIG. 2 illustrates a nonlimiting example of a μ-PD carbon fiber growth apparatus 200. It is to be understood that the EFG method may employ a similar apparatus, wherein the carbon fiber is pulled upwards rather than downwards. Accordingly, the described below with reference to FIG. 2 is unlimited as to the direction of the pulling from the meniscus to form the carbon fiber.

As shown, the apparatus 200 comprises a crucible 202. The material of the crucible 202 may be a material that has a higher melting point than the growth temperature of the desired crystal fiber and mechanically strong enough to operate at growth temperatures for the duration of crystal fiber production. Carbon-metal melt 204 for forming a carbon fiber is heated within the interior of the crucible 202. A bottom portion of the crucible includes a micro-channel nozzle 206, which has a length of x. At and above the nozzle 206, the carbon-metal melt 204 within the crucible 202 is heated to a temperature above the liquidus. Below the nozzle 206, a meniscus 208 is formed by the carbon-metal melt. The temperature below the nozzle 206 and at the meniscus 208 is below the liquidus. A carbon fiber seed 210 is oriented below the nozzle 206 so as to contact the meniscus 208. Carbon fibers are grown by continuously pulling down (in the direction of the illustrated arrow) crystalized carbon from the carbon-metal melt 204 at the meniscus 208 and away from the seed 210. The pulling down rate should be set to maintain contact between the seed 210 and the meniscus 208.

The size (diameter) and shape of the nozzle 206 dictates the size and shape of the resultant carbon fiber, and can be manipulated to alter said size and shape. The length x of the nozzle 206 may be 1 μm to 1,000 μm, such as 1 μm to 500 μm, or 5 μm to 250 μm, or 5 μm to 10 μm. Typically, the nozzle 206 is spherical or semispherical in shape, having a diameter of 1 μm to 100 μm, such as 1 μm to 50 μm, or 5 μm to 25 μm, or 5 μm to 10 μm. Accordingly, the carbon fibers produced in accordance with the μ-PD method of the preset disclosure may have a diameter of 1 μm to 100 μm, such as 1 μm to 50 μm, or 5 μm to 25 μm, or 5 μm to 10 μm. It is to be appreciated that nozzles of other shapes may be employed, depending on the desired shape of the resultant carbon fiber, such as a square, rectangle, or other polygonal shape (e.g., to produce carbon fiber sheets), without departing from the scope of the present disclosure.

Depending on the length x of the nozzle 206 and the liquidus temperature for the particular carbon-metal melt, a maximum pulling rate (either a pulling down rate, as shown in FIG. 2, or a pulling up rate if the EFG method is used, for example) can be estimated. The maximum pulling rate ($dx/dt$) is determined by carbon diffusivity D in the particular carbon-metal melt composition through the shaper's nozzle 206 length x from the melt to the meniscus 208. The diffusion distance through the nozzle 206 is $x=2\sqrt{Dt}$. Accordingly, for example, at $x=10$ μm, a carbon fiber of approximately 10 μm in diameter can be pulled down (or pulled up, if EFG was used) at a rate from a Ni—C alloy feedstock of 1,000 mm/min and should be operated at 2,150° C. based on the diffusivity of carbon in nickel.

Depending on various factors, such as the carbon-metal melt composition and the carbon diffusivity, among other factors, for example, the pulling rate using the capillary die-based fiber shaper techniques of the present disclosure may be about 10 mm/min to about 10,000 mm/min, such as 10 mm/min to 1,000 mm/min, or 100 to 5,000 mm/min, or about 1,000 to 10,000 mm/min, and the desired resultant carbon fiber may have a length of about 0.5 km to about 50 km, or 1 km to 30 km, or 1 to 10 km.

Figure 3:
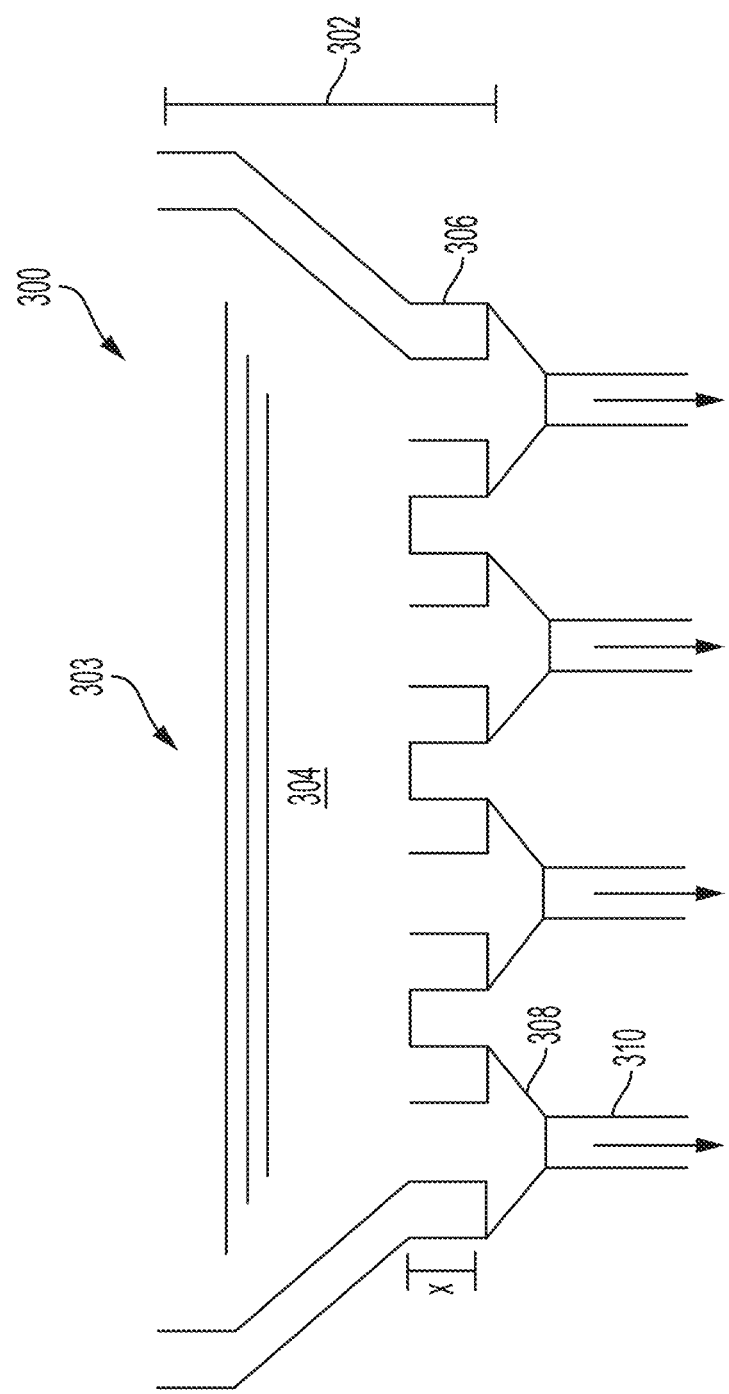
FIG. 3 illustrates a nonlimiting example of a carbon fiber reactor according to one or more aspects of the present disclosure.

FIG. 3 illustrates a nonlimiting example of a carbon fiber reactor 300 of the present disclosure. It is to be understood that the EFG method may employ a similar apparatus, wherein the carbon fiber is pulled upwards rather than downwards. Accordingly, the described below with reference to FIG. 3 is unlimited as to the direction of the pulling from the meniscus to form the carbon fiber.

The carbon fiber reactor 300 of the present disclosure is scaled for commercial production of high-value carbon fiber, such as from low-value carbon feedstock received from the methane pyrolysis process described herein. The reactor 300 comprises a common crucible 302 forming a receptacle 303 for heating carbon-metal melt 304. As shown, the receptacle 303 may receive a large volume of solid carbon feedstock into common receptacle 303, where it is heated to a temperature above the liquidus to form the carbon-metal melt 304. The volume capacity of the reactor 300 may depend on a number of factors including, but not limited to, the amount of solid carbon feedstock received from a particular wellsite, the equipment footprint availability space, and the like. The carbon fiber reactor 300 may have a receptacle 303 volume capacity of about 1 mL or greater, such as 1 mL to 1,000 mL, or about 10 mL to about 800 mL, or about 500 mL to about 1,000 mL. It is to be noted, however, that a larger volume capacity of the receptacle 303 is contemplated, without departing from the scope of the present disclosure, depending on the amount of carbon fiber to be produced.

A plurality of nozzles 306 extend from receptacle 303, each having a length of x. Four (4) nozzles 306 are shown for simplicity, but it is to be appreciated that the number of nozzles 306 for commercial scale carbon fiber production in accordance with the present disclosure is significantly greater, while having a similar configuration. Indeed, the carbon fiber fabrication process may be designed to produce carbon fibers on the order of about 1 kg/d to about 10,000 kg/d (e.g., 100 kg/d to 10,000 kg/d, or 7,000 kd/d to 10,000 kg/d, or about 8,000 kg/d), and thus require upwards of several million or more nozzles, depending on the nozzle diameter, length, and desired pulling rate.

As provided above, the plurality of nozzles 306 may be upwards of several millions or more. The plurality of nozzles may be 100,000 to 50 million, or 1 million to 40 million, or 5 million to 40 million. In some aspects, the nozzles 306 are in the form of an array, having nozzles in a X-by-Y array (or grid) pattern, where X is an integer in the range of 20 to 5,000 nozzles (or 40 to 4,000 nozzles, or 40 to 2,000 nozzles) and Y is an integer in the range of 2,000 to 2,000,000 nozzles (or 2,000 to 1,500,000 nozzles, or 2,000 to 1,000,000 nozzles). Ideally, the reactor 300 is designed to account for various compositions of solid carbon feedstocks for forming the carbon-metal melt and the resulting carbon fibers therefrom. Moreover, depending on a number of factors, such as production capacity, carbon feedstock input concentration, and the like, a portion of the nozzles may be plugged or otherwise rendered inoperable during certain carbon fiber fabrication processes, without departing from the scope of the present disclosure.

For example, based on the carbon fiber pulling rate from a Ni—C alloy feedstock of 1,000 mm/min at 2,150° C. described above, and a 10 μm diameter carbon fiber is desired (i.e., the nozzle is 10 μm in diameter), a methane pyrolysis process that produces 1.6 t/d of Ni—C solid feedstock will require 8 million nozzles, such as in a 2,000×4,000 array.

As similarly described above with reference to FIG. 3, at and above the plurality of nozzles 306, the carbon-metal melt 304 within the receptacle 303 of the crucible 302 is heated to a temperature above the liquidus. Below each of the plurality of nozzles 306, a meniscus 308 is formed by the carbon-metal melt. The temperature below the plurality of nozzles 306 and at the meniscus 308 is below the liquidus. A carbon fiber seed 310 is oriented below the plurality of nozzles 306 so as to contact each meniscus 308. Carbon fibers are grown by continuously pulling down (in the direction of the illustrated arrow) crystalized carbon from the carbon-metal melt 304 at the meniscus 308 and away from the seed 310. The pulling down rate should be set to maintain contact between the seed 310 and the meniscus 308.

Figure 4:
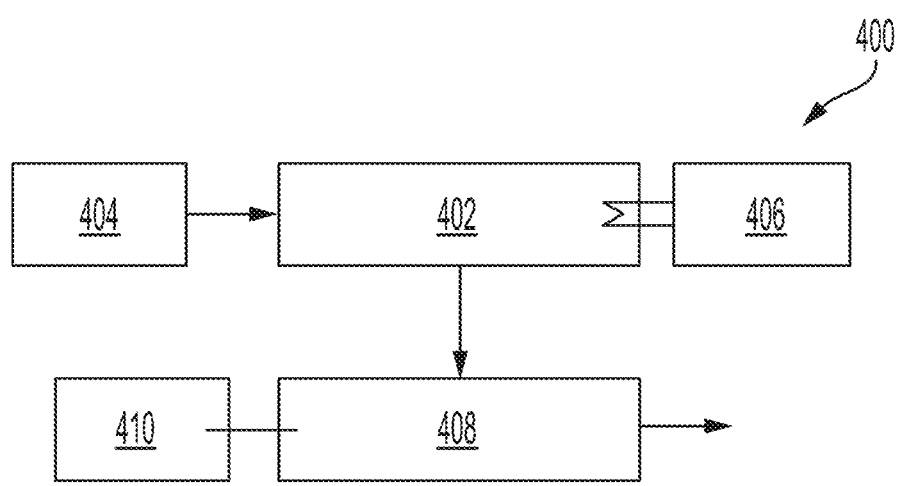
FIG. 4 illustrates a nonlimiting example of a carbon fiber fabrication system of the present disclosure.

FIG. 4 illustrates a nonlimiting example of a carbon fiber fabrication system 400 of the present disclosure.

The system includes a carbon fiber reactor 402. The carbon fiber reactor 402 may be substantially similar to the carbon fiber reactor 300 of FIG. 3, comprising receptacle 303 and plurality of shaped nozzles 306. The reactor 402 receives solid carbon feedstock 404, such as that derived from low-value carbon sources, such as flared natural gas from an oil and gas wellsite. In such instances, the solid carbon 404 may be transported from the oil and gas production site to a centralized facility comprising the carbon fiber fabrication system 400. The centralized facility may be located at the wellsite itself or provided an onsite location, without departing from the scope of the present disclosure. Further, prior to providing the solid carbon 404 to the reactor 402, it may be stored in a storage vessel for later use. In such a manner, all or only a portion of the solid carbon 404 may be used in any single carbon fiber fabrication process.

The solid carbon 404 is heated in the reactor 402 in the presence of a metal (or may itself have metal impurities already) to form a carbon-metal melt by one or more heaters 406 above the liquidus to form a carbon melt. The heater may, for example, be an electric heater, an induction heater, a boiler, a heat exchanger, and the like, and any combination thereof, provided that alone or in combination they are capable of heating the solid carbon 404 within the reactor 402 above the relevant liquidus (e.g., 1,000° C. to 3,000° C., or 1,500° C. to 2,500° C.). The source of the heater 406 may comprise tubular heating elements, cartridge heaters, strip heaters, cast-in heaters, and the like, and any combination thereof.

Molten metal-carbon menisci are formed in each of the (available) nozzles of reactor 402 and the melt at the meniscus is cooled to below the melt liquidus temperature in the presence of a carbon fiber seed provided to each nozzle. Carbon fibers are continuously pulled away at the desired pulling rate using the μ-PD method described herein. Each carbon fiber is collected by a fiber winder 408. The fiber winder 408 may be comprised of a plurality of spools operated by a motor 410 or other system (e.g., conductivity-actuated electrical control circuit) to rotate the spools as the carbon fibers are collected thereon. The rate of rotation of the plurality of spools will depend on the particular pulling rate for the carbon fiber fabrication process and each of the plurality of spools may receive carbon fibers from a plurality of nozzles. For example, each spool may comprise about 1,000 to about 50,000 fibers, which are about 5 to about 15 μm in diameter, and about 1 to about 50 km in length. Each spool may be stored or otherwise immediately shipped to the market (arrow shown).

In some aspects, the carbon fibers may be further processed after production. For example, the carbon fibers may be optionally graphitized to enhance the mechanical properties of the carbon fibers. Graphitization may be performed at about 1,500° C. to about 3,000° C., for example.

The carbon fibers produced according to the methods described herein, utilizing low-value carbon feedstock derived from methane pyrolysis and formed using the crystal fiber forming method, such as μ-PD or EFG methods, are suitable for use as substitutes for currently available carbon fibers. They advantageously exhibit equivalent mechanical properties (ASTM D4018-99) at a much reduced cost, as described herein.

Methane Pyrolysis Process—Carbon Source for Carbon-Metal Melt

As provided above, in one or more aspects, the solid carbon for use as feedstock in the carbon fiber fabrication process of the present disclosure may be derived from any source. In certain embodiments, the source is from a methane pyrolysis process utilizing low-value carbon sources to produce hydrogen and solid carbon, as described herein below.

The methane pyrolysis process of the present disclosure is optimized for solid carbon production, with hydrogen as a byproduct which may be used to provide heat to the process. In one or more aspects, the pyrolysis process uses a low boiling point metal (e.g., zinc or any other appropriate metal) in the gas phase to catalyze methane pyrolysis upon condensing to nano-sized liquid droplets, whereby the metal enthalpy of vaporization provides the methane pyrolysis heat of reaction.

Figure 5:
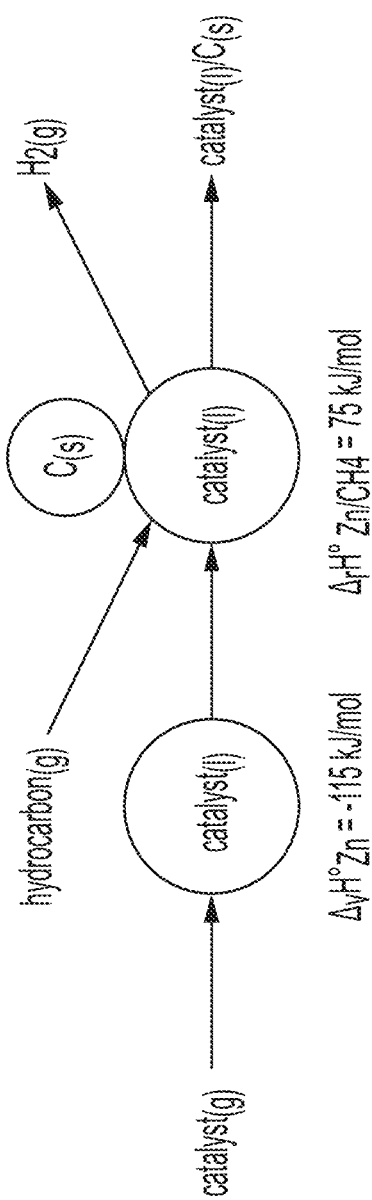
FIG. 5 illustrates a portion of the hydrocarbon pyrolysis approach according to one or more aspects of the present disclosure.

FIG. 5 illustrates a portion of the methane pyrolysis process described herein. First, the catalyst gas [catalyst(g)] condenses into a catalyst droplet of catalyst liquid [catalyst (l)]. Condensation of the catalyst gas to catalyst liquid has a negative change in enthalpy and is exothermic. As illustrated, the catalyst liquid then catalyzes decomposition of a hydrocarbon gas [hydrocarbon(g)] to form solid carbon [C(s)] and hydrogen [$H_2$(g)]. However, the illustration does not preclude the gas phase catalyst from also catalyzing the decomposition reaction.

The heat of reaction of the hydrocarbon decomposition process is positive, and therefore, endothermic. Superheated catalyst gas at partial pressure ($p_C$) may be mixed with much cooler hydrocarbon gas ($p_H$), such that the total reactor pressure is $p_{total}=p_M+p_H$ and the catalyst fill fraction is $f=p_M/p_{total}$. Without being limited by theory, it is believed that catalyst, hydrocarbon, and reactor conditions (e.g., pressure and temperature) can be chosen so that the exothermic process of condensing the catalyst gas to catalyst liquid provides sufficient heat to drive the pyrolysis reaction.

As a suitable specific example, the methane pyrolysis process may use homogeneous nucleation of condensing gaseous zinc (e.g., Tb=900° C., partial pressure 1 bar) to form nano-sized liquid droplets at high fill fractions to achieve high catalytic areal densities for catalyzing methane pyrolysis. These high surface area droplets lead to methane pyrolysis with high reactor space time yields, high gas hourly space velocities, and high single-pass methane conversion rates (e.g., about 80% or more, or about 90% or more). These qualities permit desirable compact, modular methane pyrolysis construction and transportability. Moreover, the enthalpy of condensation for zinc is about −115 kJ/mol energy, while the zinc-catalyzed pyrolysis of methane heat of reaction is only about 75 kJ/mol energy. Therefore, the condensation portion of the method is able to provide the pyrolysis enthalpy, which has the potential to simplify reactor thermal management and reduce the production cost because additional energy input is needed only to a minimal extent, if at all. A zinc-based methane pyrolysis can also facilitate solid carbon separation because trace zinc catalyst can be easily evaporated therefrom, and when the hydrocarbon source is natural gas, it provides an inherent gettering system for removing contaminants therefrom (e.g., $H_2S$, $CO_2$, and the like) because it reacts favorably to produce easily separable solids.

Figure 6:
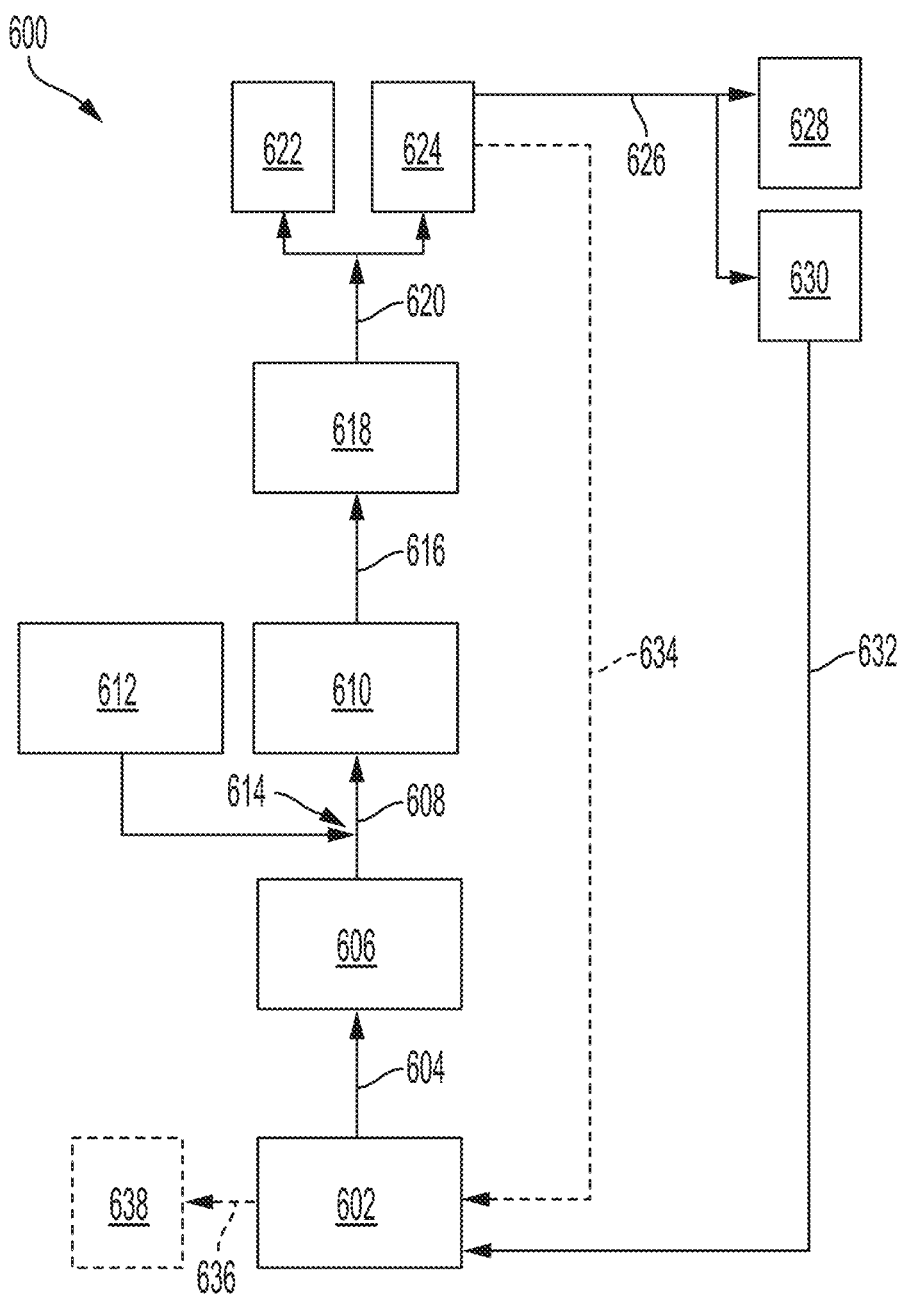
FIG. 6 illustrates a nonlimiting example of a hydrocarbon pyrolysis method according to one or more aspects of the present disclosure.

FIG. 6 illustrates a nonlimiting example of a methane pyrolysis process 600 of the present disclosure.

A catalyst source 602 is evaporated 604 to produce a catalyst gas 606. Optionally, a carrier gas inert to the decomposition reaction (e.g., argon, nitrogen, and the like, and any combination thereof) can be included in the evaporation.

Catalysts suitable for use in the methods described herein preferably have a boiling point of above about 700° C. and less than about 1,200° C. (or about 800° C. to about 1,100° C., or about 900° C. to about 1,000° C.). Examples of catalysts include, but are not limited to, metals, molten salts, ionic liquids, and the like. Examples of metal catalysts include, but are not limited to, zinc, cesium, selenium, rubidium, potassium, cadmium, sodium, polonium, tellurium, magnesium, ytterbium, lithium, strontium, thallium, calcium, and the like, and any combination thereof. Preferred metal catalysts include, but are not limited to, zinc, sodium, magnesium, and any combination thereof. Suitable salt catalysts may be salts comprising (a) alkali metal cation, alkaline earth metal cation, transition metal cation, or another metal cation and (b) an anion, such as nitrate, citrate, halide, cyanide, and hydride. Specific examples of salt catalysts include, but are not limited to, sodium chloride, sodium bromide, sodium iodide, sodium sulfate, lithium chloride, lithium bromide, lithium iodide, lithium sulfate, potassium chloride, potassium bromide, potassium iodide, potassium fluoride, magnesium chloride, magnesium bromide, calcium iodide, zinc chloride, zinc bromide, and the like, and any combination thereof.

The temperature of the catalyst gas 606 is greater than the boiling point of the catalyst. Preferably, temperature of the catalyst gas 606 is about 5° C. to about 500° C. (or about 5° C. to about 50° C., or about 50° C. to about 100° C., or about 100° C. to about 250° C., or about 200° C. to about 500° C.) greater than the boiling point of the catalyst.

The catalyst gas 606 is then condensed 608 to form a catalyst vapor 610 comprising catalyst droplets. Condensation is achieved by lowering the temperature of the catalyst gas 606, which can be achieved by a variety of methods. For example, the reactor may be designed to have the catalyst gas 606 pass through a portion of the reactor that is sufficiently cooler than the catalyst gas 606 to produce the catalyst vapor 610. In another example, the catalyst gas 606 may be contacted 614 (e.g., mixed) with a hydrocarbon gas 612 that is at a low enough temperature to promote condensation 608 of the catalyst gas 606. In this example, the hydrocarbon gas 612 may be at about 5° C. to about 500° C. (or about 5° C. to about 50° C., or about 50° C. to about 100° C., or about 100° C. to about 250° C., or about 200° C. to about 500° C.) less than the boiling point of the catalyst.

The pressure of the catalyst gas 606 may affect the size of the catalyst droplets and density of the catalyst droplets, where a higher pressure may lead to a higher density of catalyst droplets. The pressure of the catalyst gas 606 may be about 0.1 bar to about 200 bar (or about 0.1 bar to about 25 bar, or about 0.5 bar to about 100 bar, or about 10 bar to about 200 bar).

The catalyst vapor 610 may comprise catalyst droplets having a diameter of about 5 nm to about 1,000 nm (or about 5 nm to about 150 nm, or about 10 nm to about 250 nm, or about 250 nm to about 1,000 nm). Further, the catalyst vapor 610 may comprise catalyst droplets such that about 60 vol % or less (or about 0.1 vol % to about 60 vol %, or about 0.1 vol % to about 5 vol %, or about 0.1 vol % to about 10 vol %, or about 5 vol % to about 30 vol %, or about 25 vol % to about 50 vol %) of the catalyst vapor 610 is catalyst droplets (or catalyst liquid). Accordingly, a catalytic areal density of the catalyst vapor 610 per reactor volume may be as high as about 10,000 m$^2$/m$^3$ (or about 1,000 m$^2$/m$^3$ to about 100,000 m$^2$/m$^3$, or about 5,000 m$^2$/cm$^3$ to about 20,000 m$^2$/m$^3$, or about 15,000 m$^2$/cm$^3$ to about 30,000 m$^2$/cm$^3$).

Having a high catalytic surface area may allow for a higher gas hourly space velocity, which may improve the potential for commercial viability of the methods described herein and allow for a compact, modular and transportable design for use in carbon fiber production according to the present disclosure. The methods described herein may be performed with a gas hourly space velocity of about 1,000 h$^-$ to about 100,000 h$^-$ (or about 1,000 h$^-$ to about 10,000 h$^-$, or about 1,000 h$^{-1}$ to about 5,000 h$^{-1}$, or about 5,000 h$^-$ to about 25,000 h$^{-1}$, or about 25,000 h$^-$ to about 100,000 h$^{-1}$). Higher catalytic areal density contributes, at least in part, to a higher required gas hourly space velocity.

The catalyst vapor 610 and the hydrocarbon gas 612 react such that the catalyst (gas phase and/or liquid phase) catalyzes the decomposition reaction 616 of the hydrocarbon gas 612. FIG. 6 illustrates the hydrocarbon gas 612 and the catalyst (gas phase and/or liquid phase) being in contact during formation of the catalyst vapor 610. However, the hydrocarbon gas 612 may be introduced in the process at any time point before reaction 616 including at evaporation, during condensation, after condensation, and any combination thereof. For example, hydrocarbon gas 612 may be introduced to the process at multiple locations.

The hydrocarbon gas 612 may include a C1 to C20 alkane (linear, branched, and/or cyclic), a C1 to C20 alkene (linear, branched, and/or cyclic), a C1 to C20 alkyne (linear, branched, and/or cyclic), a C6 to C20 arene, and any combination thereof. For example, the hydrocarbon gas may comprise methane, ethane, and/or propane. For use in the present disclosure, the hydrocarbon gas 612 is derived from a low-value carbon source, as described hereinabove and in any combination (e.g., solid carbon derived from natural gas (e.g., flared natural gas), biogas, pyrolysis gas, petcoke, coal, soot, recycled carbon fiber waste, recycled plastics, biomass, organic waste, other fossil fuels, and the like, and any combination thereof.

Generally, the catalyzed decomposition reaction 616 occurs with little to no reactive oxygen-containing compounds present so as to minimize the production of carbon dioxide. For example, the gas phase that the catalyst (gas phase and/or liquid phase) are exposed to preferably has less than about 1 vol % (or 0 vol % to about 1 vol %, or about 0.01 vol % to about 0.1 vol %) of oxygen-containing compounds cumulatively that are reactive in the decomposition reaction to produce carbon dioxide. Such oxygen-containing compounds include, but are not limited to, oxygen ($O_2$), carbon monoxide, water, and the like, and any combination thereof.

The catalyst vapor 618 that comprises the hydrogen, catalyst droplets, optionally catalyst gas, and carbon is further condensed to separate 620 the gas components 622 (e.g., hydrogen gas, optionally unreacted hydrocarbon gas, and optionally catalyst gas) from the solid/liquid mixture 624 comprising carbon and catalyst liquid.

The hydrogen in the gas components 622 can be further separated from the other components with a condenser and/or other separator, for example.

The solid carbon 628 can then be separated 626 from the mixture 624 by known methods including mechanical separation (e.g., filtration, gravimetric, cyclonic, or the like) and/or thermal separation (e.g., via evaporation of the catalyst). For example, high vapor pressure catalysts like zinc make induction-heating methods that evaporate the catalyst from solid carbon more efficient. Further, such methods add heat to the catalyst, which reduces the additional heat needed for downstream evaporation if the catalyst is recycled back to the catalyst source 602.

The catalyst liquid 630 can then be recycled 632 back to the catalyst source 602. As an alternative to the separation 626 before recycle 632 procedure, the mixture 624 can be recycled 634 to the catalyst source 602, and the carbon 638 can be separated 636 from the catalyst source 602.

Preferably, the catalyst is chosen so that (a) the carbon and catalyst do not react or form an alloy and (b) the carbon does not dissolve in the catalyst liquid, which allows for the carbon to be naturally in a solid phase (e.g., as slag, carbon fibers, graphene, diamond, glassy carbon, high-purity graphite, carbon nanotubes, carbon black, coke, activated charcoal, and the like, and any combination thereof) that can be separated from the catalyst, which is in liquid form. Separation of the carbon 628, 638 from the mixture 624 or catalyst source 602 may be achieved by filtration, gravimetric separation, mechanical removal of floating solid carbon, cyclone separation, and the like, and any combination thereof.

Figure 7:
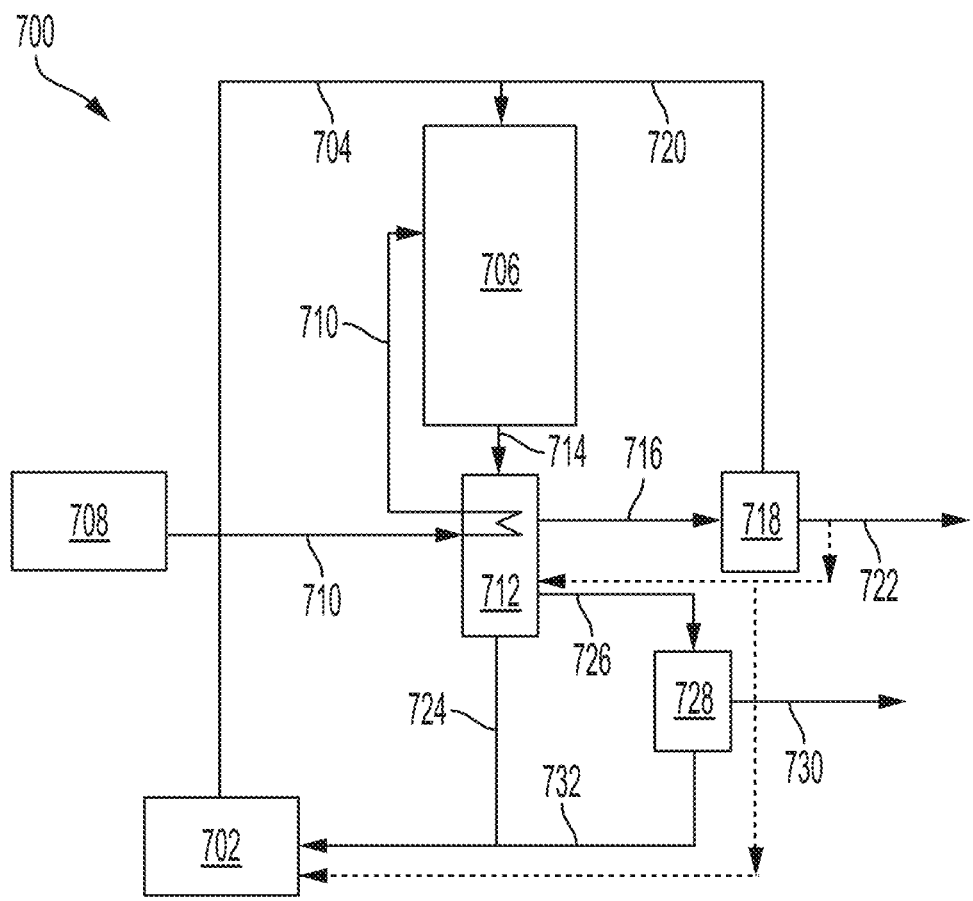
FIG. 7 illustrates a nonlimiting example system according to one or more aspects of the present disclosure.

FIG. 7 illustrates a nonlimiting example system 700 of the present disclosure.

As used herein, when describing components of a system that are coupled via streams, the coupling refers to fluids and/or solids being able to travel or be transported from one component to the other or between components. When traversing a coupling, the fluids and/or solids may travel through hardware, such as lines, pipes, pumps, conveyors, augers, extruders, connectors, heat exchangers, valves, mass flow controllers, cooling towers, compressors, boilers, reactors, and the like that ensure proper operation and safety measures when operating the system. While a single stream is used to describe the coupling, the stream may physically be implemented as multiple lines, pipes, and the like, and include additional hardware along said stream, without limitation. Further, as will be apparent to those skilled in the art, the system 700 illustrated in this nonlimiting example may include additional components like compressors, membranes, valves, flow meters, heat exchangers, traps, and the like for proper and safe operation of the methods described herein.

The system 700 includes a catalyst source evaporator 702 is coupled to a reactor 706 via stream 704. The catalyst source evaporator 702 evaporates the catalyst source therein to produce the catalyst gas, which is conveyed to the reactor 706 via stream 704. Optionally, a carrier gas inert to the decomposition reaction (e.g., argon, nitrogen, and the like, and any combination thereof) can be included in the stream 704.

The system 700 also includes a hydrocarbon source 708 coupled to the reactor 706 via stream 710. As illustrated, the stream 710 passes through a cooling column 712, which heats the hydrocarbon in the stream 710. The hydrocarbon source 708 may be obtained from a flare gas stack, a pipeline, a tank, a truck tank, a distillation column, and the like, and any combination thereof. When the hydrocarbon from the hydrocarbon source 708 is introduced to the reactor 706, the hydrocarbon should be a hydrocarbon gas. Notably, the methane pyrolysis process of the present disclosure is robust to variable types of hydrocarbon gas feedstocks, including wet, dry, sour, and acid gas feedstocks.

As illustrated, the hydrocarbon gas is introduced to the reactor 706 downstream of the catalyst gas. However, in alternate embodiments, the hydrocarbon gas can be introduced upstream of or in parallel with the catalyst gas.

With continued reference to FIG. 7, within the reactor 706, the catalyst gas becomes a catalyst vapor and reacts with the hydrocarbon gas. The hydrocarbon gas should be introduced to the reactor in such a way to mitigate the formation of turbulence or eddies that would facilitate condensation of the catalyst droplets in the catalyst vapor.

They hydrocarbon gas reacts with the catalyst (gas phase and/or liquid phase) to produce hydrogen and solid carbon. Therefore, the discharge stream 714 from the reactor 706 comprises hydrogen, catalyst (gas phase and/or liquid phase), and carbon solid, and may further comprise unreacted hydrocarbon gas and/or reaction byproducts and/or carrier gas. Stream 714 fluidly couples the reactor to the cooling column 712. In the cooling column, the catalyst condenses into a liquid so as to separate the catalyst from the other gas phase components (e.g., hydrogen, unreacted hydrocarbon gas, reaction byproducts, and/or carrier gas) of the stream 714. However, some catalyst may remain in gas form. The catalyst liquid and solid carbon pool settle to the bottom of the cooling column 712, whereas the gas phase components remain above the settled portion in cooling column 712. The gas phase components exit the column 712 via stream 716. The stream 716 couples the cooling column 712 to a separator 718. The separator 718 separates the hydrogen from the other gas components to produce a hydrogen stream 722 and a stream 720 comprising the unreacted hydrocarbon, the reaction byproducts (when present), the carrier gas (when present), and/or catalyst gas (when present). In the separator 718, the catalyst gas, when present, may also condense to catalyst liquid, which would produce another stream (not illustrated) that could recycle back to the catalyst source evaporator 702 or another stream or component where catalyst liquid is present. The separator 718 may operate via condensation, filtration, and/or other suitable principles.

As illustrated, the stream 720 couples the separator 718 to the reactor 706 for further reaction of the components of the stream 720. However, recycling is not required in the systems and methods described herein.

The stream 722 comprising the hydrogen may have an elevated temperature and can beneficially be used as a source of heat for use in the methane pyrolysis process, such as by recirculation to the cooling tower 712 or the catalyst source evaporator 702 (dashed lines). In other instances, the stream 722 comprising the hydrogen may be compressed, stored, and/or transported as desired, or used as a source of heating for the methane pyrolysis process. The stream 722 may comprise 80 vol % or greater (or 80 vol % to 100 vol %, or 90 vol % to 100 vol %, or 95 vol % to 99.5 vol %) hydrogen.

The catalyst liquid and solid carbon pooled in the bottom of the cooling column 712 are separated. The method and/or system for separation of the catalyst liquid and solid carbon depends on the catalyst, the solubility and/or alloying of the catalyst with the carbon, the relative densities of the catalyst liquid and the solid carbon, among other factors. In the illustrated system 700 of FIG. 7, the solid carbon is not soluble in the catalyst liquid, and the solid carbon has a lower density than the catalyst liquid. Therefore, the solid carbon floats in the pooled catalyst liquid. Accordingly, the top portion of the pooled material can be extracted from the column 712 via stream 726. The stream 726 fluidly couples the cooling column 712 to a separator 728. The separator 728 may operate via evaporation, filtration, and/or other suitable principles to separate the catalyst from the solid carbon to produce a stream 730 comprising the solid carbon and a stream 732 comprising the catalyst.

As illustrated, the stream 732 couples the separator 728 to the catalyst source evaporator 702. However, recycling is not required in the systems and methods described herein. The stream 732 may comprise 80 vol % or greater (or 80 vol % to 100 vol %, or 90 vol % to 100 vol %, or 95 vol % to 99.5 vol %) catalyst liquid.

The bottom of the pooled material is catalyst liquid having little to no solid carbon and, therefore, can be recycled back to the catalyst source evaporator 702 via stream 724. The stream 724 couples the cooling column 712 to the catalyst source evaporator 702. Again, recycling is not required, but is preferred, in the systems and methods described herein. The stream 724 may comprise 80 vol % or greater (or 80 vol % to 100 vol %, or 90 vol % to 100 vol %, or 95 vol % to 99.5 vol %) catalyst liquid.

The stream 730 comprising the solid carbon is used for processing into high-value carbon fiber using the carbon fiber fabrication process described herein. The stream 730 may comprise 80 vol % or greater (or 80 vol % to 100 vol %, or 90 vol % to 100 vol %, or 95 vol % to 99.5 vol %) solid carbon.

The methane pyrolysis process (e.g., system 700 of FIG. 7) described herein may preferably be employed onsite at an oil and gas wellsite to minimize transportation and equipment costs. In some instances, the methane pyrolysis process may be small-sized, modular, and field-transferrable. For example, with reference to a natural gas hydrocarbon source (e.g., flared gas), the methane pyrolysis process may have a maximum nameplate capacity of about 100 Mcfd, such as in the range of about 10 Mcfd to about 100 Mcfd, or about 30 Mcfd to about 100 Mfcd, or about 50 Mfcd to about 100 Mfcd.

It is to be understood, however, that the methane pyrolysis (and carbon fiber fabrication process) may be employed at any offsite location, without departing from the scope of the present disclosure.

Integrated Methane Pyrolysis Process and Carbon Fiber Fabrication Process

In some instances, the methane pyrolysis process and the carbon fiber fabrication process may be integrated into a single reactor. The integrated reactor decouples the pyrolysis process from the carbon fiber fabrication process.

Figure 8:
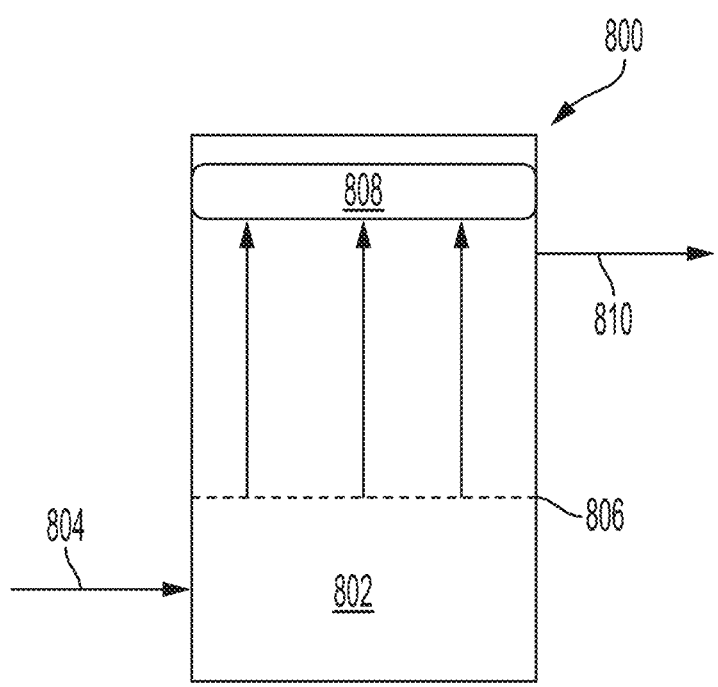
FIG. 8 illustrates a nonlimiting example of an integrated carbon fiber system according to one or more aspects of the present disclosure.

FIG. 8 illustrates a nonlimiting example of an integrated carbon fiber system 800 of the present disclosure.

The system 800 includes methane pyrolysis section 802 which comprises molten methane pyrolysis catalysts, as described above. The molten catalyst may be heated by an internally provided or externally provided (e.g., jacketed) heat source. An inlet receives low-value carbon 804, such as those described above (e.g., flared natural gas). Methane pyrolysis takes place in the pyrolysis section 802, which may be in the form of a bubble column reactor. The carbon dissolves to form a molten ternary allow, and a nucleation zone is provided at the surface 806. Carbon fiber seeds are provided at the nucleation zone 806 where carbon fibers nucleate and are continuously pulled up (vertical, upward arrows), in a method similar in form to the µ-PD method described above, and collected on one or more bobbins (spools) 808. Hydrogen byproduct 810 exits the system 800 and, in some instances, may be recycled back into the reactor to provide heat.

It is to be appreciated that the continuous pulling up carbon fiber fabrication method described with reference to integrated system 800 may be equally applicable to the μ-PD method described herein, where the pyrolysis section 802 is oriented such that the carbon fiber is nucleated and carbon fiber growth is achieved by pulling in a downward direction, as described hereinabove.

EXAMPLE EMBODIMENTS

Clause 1. A method comprising: contacting a carbon fiber seed with a carbon-metal melt, drawing the carbon fiber seed at a pulling rate to form a carbon fiber.

Clause 2. The method of claim 1, wherein when the pulling rate is a pulling down rate from a meniscus of the carbon-metal melt, a temperature of the carbon-metal melt above the meniscus is above liquidus and the temperature below the meniscus is below liquidus; and when the pulling rate is a pulling up rate from the meniscus of the carbon-metal melt, a temperature of the carbon-metal melt below the meniscus is above liquidus and the temperature above the meniscus is below liquidus.

Clause 3. The method of any of the preceding Clauses, wherein the pulling rate is about 1 mm/min to about 10,000 mm/min.

Clause 4. The method of Clause 3, wherein the pulling rate is 1,000 mm/min.

Clause 5. The method of any of the preceding Clauses, wherein the carbon fiber has a diameter in the range of about 1 μm to about 100 μm.

Clause 6. The method of any of the preceding Clauses, wherein the carbon fiber has a length of about 0.5 km to about 50 km.

Clause 7. The method of any of the preceding Clauses, wherein the carbon-metal melt comprises a carbon source selected from the group consisting a hydrocarbon gas, a hydrocarbon liquid, a hydrocarbon solid, a natural gas, a flared natural gas, a biogas, a pyrolysis gas, petcoke, coal, soot, recycled pure carbon fiber waste, recycled carbon fiber composite waste, a plastic, a recycled plastic, a biomass, organic waste, petroleum, an oil, biochar, a fossil fuel, and the like, and any combination thereof.

Clause 8. The method of Clause 7, wherein the carbon source is derived from a pyrolysis reaction of a reaction gas selected from the group consisting of a hydrocarbon gas, a natural gas, a flared natural gas, a biogas, a pyrolysis gas, and any combination thereof.

Clause 9. The method of Clause 8, wherein the pyrolysis reaction comprises: evaporating a catalyst source to produce a catalyst gas; condensing the catalyst gas to produce a catalyst vapor comprising catalyst droplets suspended in a gas phase; and contacting the catalyst vapor with the reaction gas so as to catalyze a decomposition reaction of the gas into hydrogen gas and the carbon source.

Clause 10. The method of Clause 8 or Clause 9, wherein the catalyst gas before condensation is at a temperature of about 5° C. to about 500° C. greater than a boiling point of the catalyst.

Clause 11. The method of any of Clause 8 to Clause 10, wherein condensing the catalyst gas comprises: exposing the catalyst gas to the reaction gas, wherein the reaction gas is at a temperature below a boiling point of the catalyst.

Clause 12. The method of any of Clause 8 to Clause 11, wherein the catalyst is a metal catalyst selected from the group consisting of zinc, cesium, selenium, rubidium, potassium, cadmium, sodium, polonium, tellurium, magnesium, ytterbium, lithium, strontium, thallium, calcium, and any combination thereof.

Clause 13. The method of Clause 12, wherein the metal catalyst is zinc.

Clause 14. A system comprising: a carbon fiber reactor for fabricating carbon fiber, the reactor comprising a receptacle for containing a carbon-metal melt, and a plurality of nozzles through which a plurality of menisci are formed by the carbon-metal melt for contact with a carbon seed to fabricate the carbon fiber; and a heater for heating the carbon-metal melt.

Clause 15. The system of Clause 14, further comprising a carbon source coupled to the carbon fiber reactor such that the receptacle of the carbon fiber reactor receives the carbon source, the carbon-metal melt comprising at least a portion of the carbon source.

Clause 16. The system of Clause 14 or Clause 15, wherein the receptacle has a volume capacity of about 1 mL to about 1,000 mL.

Clause 17. The system of any of Clause 14 to Clause 16, wherein the plurality of nozzles comprises about 100,000 to about 50 million separate nozzles.

Clause 18. The system of any of Clause 14 to Clause 17, wherein the plurality of nozzles have a diameter of about 1 μm to about 100 μm.

Clause 19. The system of any of Clause 14 to Clause 18, wherein the plurality of nozzles have a length of about 1 μm to about 1,000 μm.

Clause 20. The system of any of Clause 14 to Clause 19, further comprising a fiber winder to receive fabricated carbon fiber from the carbon fiber reactor.

Clause 21. An apparatus comprising: a carbon fiber reactor for fabricating carbon fiber, the reactor comprising a receptacle for containing a carbon-metal melt, and a plurality of nozzles through which a plurality of menisci are formed by the carbon-metal melt for contact with a carbon seed to fabricate the carbon fiber.

To facilitate a better understanding of the embodiments of the present invention, the following examples of preferred or representative embodiments are given. In no way should the following examples be read to limit, or to define, the scope of the invention.

Example

In this example, the carbon fiber fabrication process using μ-PD was evaluated.

Figure 9:
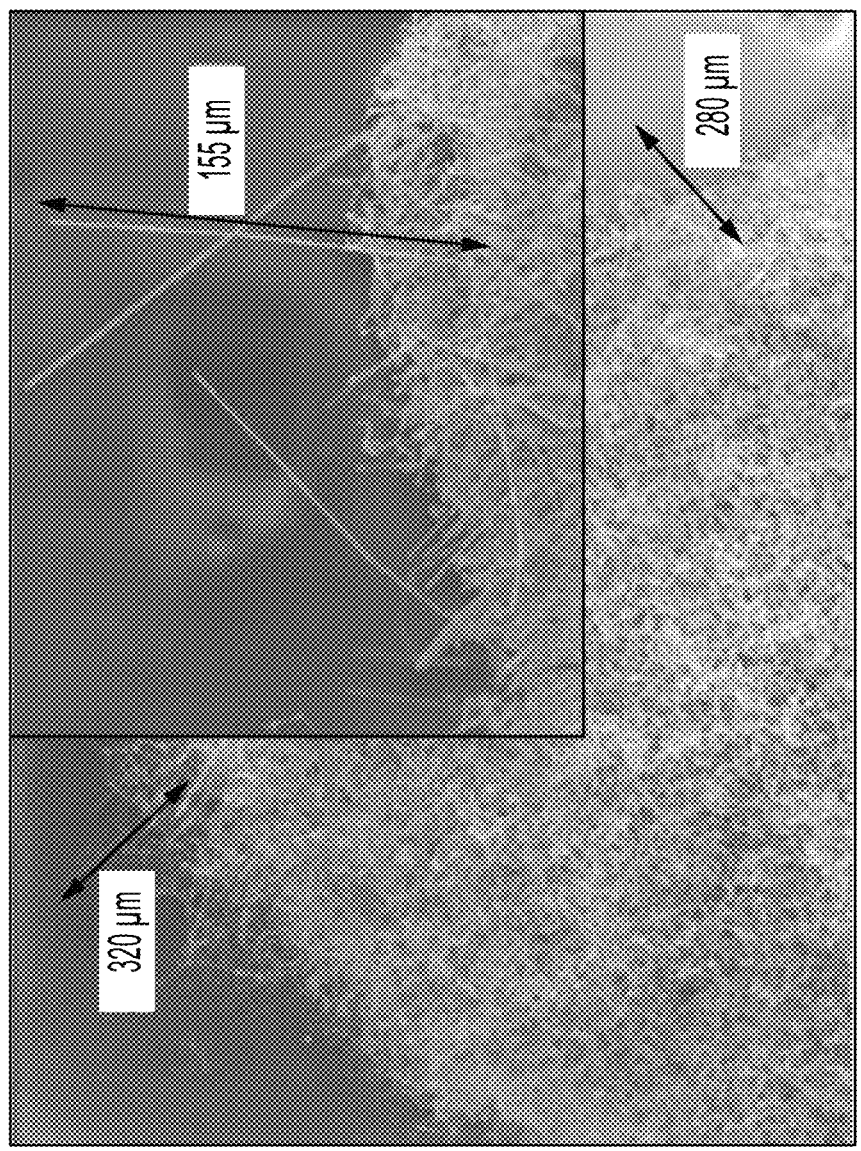
FIG. 9 is a photograph depicting a solid carbon source feedstock from a methane pyrolysis process according to one or more aspects of the present disclosure.

A thermogravimetric analyzer was used as a micro-reactor for methane pyrolysis. The setup comprised a metal catalyst (10-100 mg) in an alumina pan exposed to methane (5 vol %) for up to 5 hours. Methane pyrolysis reaction rates and Arrhenius parameters were benchmarked against solid Ni and were consistent with reported data (A=5.1 mmol/cm$_2$ s and E$_a$=87 kJ/mol). Methane pyrolysis in unseeded molten Ni$_{0.07}$Ga$_{0.93}$ at 800° C. led to filamentous solid carbon formation up to 320 μm in length with varied orientation and straightness, as shown in FIG. 9. Elemental analysis of the carbon fiber indicated residual metal content of 2.1 mol %.

Figures 10A, 10B, 10C, 10D:
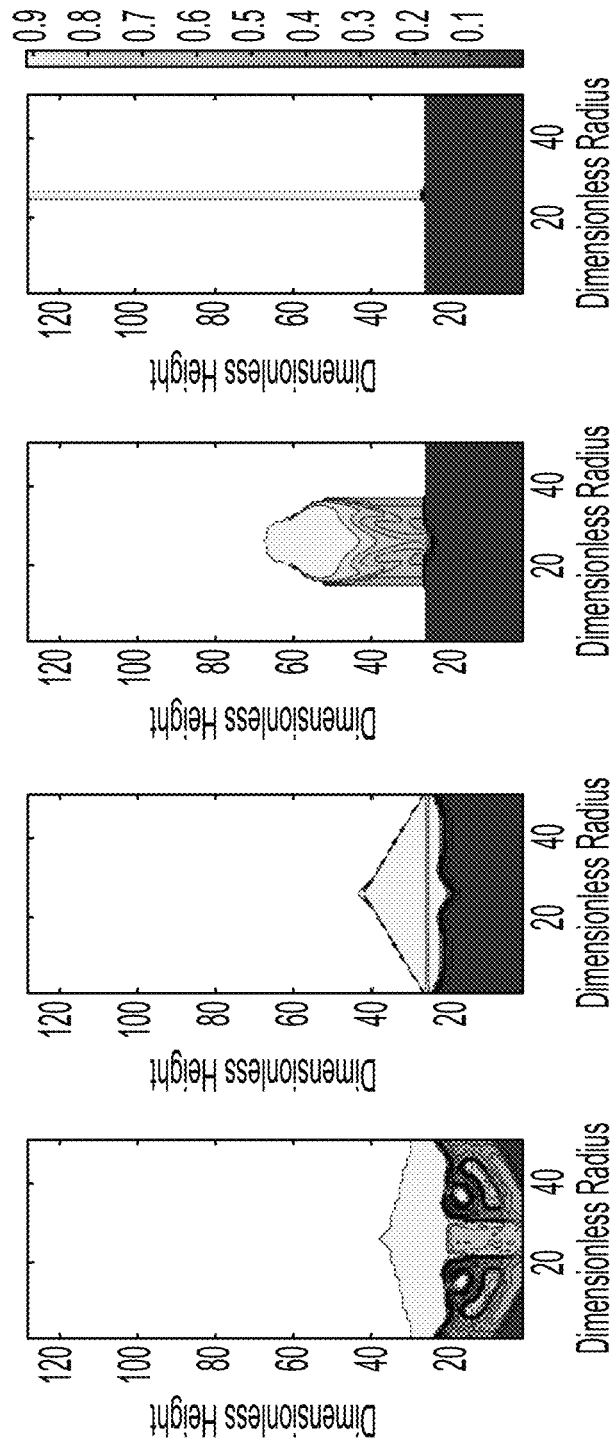
FIGS. 10A-10D show carbon fiber fabrication simulations using directional solidification using the µ-PD process according to one or more aspects of the present disclosure.

Carbon fiber fabrication was evaluated using directional solidification simulations to establish a qualitative model of microstructure evolution of crystal fiber growth. A phase-field model for directional solidification of a single-component undercooled melt was used to simulate the fiber pulling process, where a material phase order parameter (ξ) was allowed to vary between liquid (ξ=0) and solid (ξ=1). The system free energy described by a free-energy functional (F) was assumed to comprise phase-dependent and curvature-dependent components. Phase evolution is governed by the diffusion-dependent Allen-Cahn equation, and the phase flux determined by the chemical potential gradient. The simulation domain (51×51 nodes) was initialized as an undercooled liquid $C(_p\Delta T/\Delta H_{fus}=2)$ seeded with a single crystal of radius $R_0$. A solid phase ($\xi=1$) was crystallized and subsequently removed from the interface at a fixed dimensionless velocity (U). The simulation results are shown in FIGS. 10A-10D and are reported after 500 iterations and the microstructural dependence of initial seed size ($R_0$) and pulling velocity (U) is represented by contour plots of the order parameter. In FIG. 10A, dendritic growth into the carbon melt is predicted using a small carbon seed size ($R_0=1$) and pulling velocity (U=4); FIG. 10B models seed size ($R_0=1$) and pulling velocity (U=14); FIG. 10C models seed size ($R_0=6$) and pulling velocity (U=14); FIG. 10D models seed size ($R_0=1$) and pulling velocity (U=40). The model illustrates that under optimal conditions, high aspect ratio carbon fibers can be pulled from molten metal.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present invention. The invention illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

What is claimed is the following:

1. A method comprising: contacting a carbon fiber seed with a a carbon-metal melt, drawing the carbon fiber seed from at a pulling rate to form a carbon fiber.

2. The method of claim 1, wherein when the pulling rate is a pulling down rate from a meniscus of the carbon-metal melt, a temperature of the carbon-metal melt above the meniscus is above liquidus and the temperature below the meniscus is below liquidus; and when the pulling rate is a pulling up rate from the meniscus of the carbon-metal melt, a temperature of the carbon-metal melt below the meniscus is above liquidus and the temperature above the meniscus is below liquidus.

3. The method of claim 2, wherein the pulling rate is about 10 mm/min to about 10,000 mm/min.

4. The method of claim 3, wherein the pulling rate is 1,000 mm/min.

5. The method of claim 1, wherein the carbon fiber has a diameter in the range of about 1 μm to about 100 μm.

6. The method of claim 1, wherein the carbon fiber has a length of about 0.5 km to about 50 km.

7. The method of claim 1, wherein the carbon-metal melt comprises a carbon source selected from the group consisting a hydrocarbon gas, a hydrocarbon liquid, a hydrocarbon solid, a natural gas, a flared natural gas, a biogas, a pyrolysis gas, petcoke, coal, soot, recycled pure carbon fiber waste, recycled carbon fiber composite waste, a plastic, a recycled plastic, a biomass, organic waste, petroleum, an oil, biochar, a fossil fuel, and the like, and any combination thereof.

8. The method of claim 7, wherein the carbon source is derived from a pyrolysis reaction of a reaction gas selected from the group consisting of a hydrocarbon gas, a natural gas, a flared natural gas, a biogas, a pyrolysis gas, and any combination thereof.

9. The method of claim 8, wherein the pyrolysis reaction comprises: evaporating a catalyst source to produce a catalyst gas; condensing the catalyst gas to produce a catalyst vapor comprising catalyst droplets suspended in a gas phase; and contacting the catalyst vapor with the reaction gas so as to catalyze a decomposition reaction of the gas into hydrogen gas and the carbon source.

10. The method of claim 8, wherein the catalyst gas before condensation is at a temperature of about 5° C. to about 500° C. greater than a boiling point of the catalyst.

11. The method of claim 8, wherein condensing the catalyst gas comprises: exposing the catalyst gas to the reaction gas, wherein the reaction gas is at a temperature below a boiling point of the catalyst.

12. The method of claim 8, wherein the catalyst is a metal catalyst selected from the group consisting of zinc, cesium, selenium, rubidium, potassium, cadmium, sodium, polonium, tellurium, magnesium, ytterbium, lithium, strontium, thallium, calcium, and any combination thereof.

13. The method of claim 12, wherein the metal catalyst is zinc.

* * * * *